(No Model.)

A. H. DEAN & S. H. WHITING.
RAILWAY TIME RECORDER.

No. 279,723. Patented June 19, 1883.

Witnesses
James R. Bowen
Alfred L. Brown

Inventors
Albert H. Dean
Stiles H. Whiting
by their attorneys
Edwin H. Brown

UNITED STATES PATENT OFFICE.

ALBERT H. DEAN AND STILES H. WHITING, OF BRIDGEPORT, CONNECTICUT, ASSIGNORS OF ONE-THIRD TO CHARLES A. GERDENIER, OF SAME PLACE.

RAILWAY TIME-RECORDER.

SPECIFICATION forming part of Letters Patent No. 279,723, dated June 19, 1883.

Application filed January 30, 1883. (No model.)

*To all whom it may concern:*

Be it known that we, ALBERT H. DEAN and STILES H. WHITING, of Bridgeport, in the county of Fairfield and State of Connecticut, have invented a certain new and useful Improvement in Apparatus for Recording the Departure of Railway-Trains, of which the following is a specification.

The object of our improvement is to produce an apparatus whereby trains departing from a railway-station will be enabled to record the times of their departure.

Figure 1:
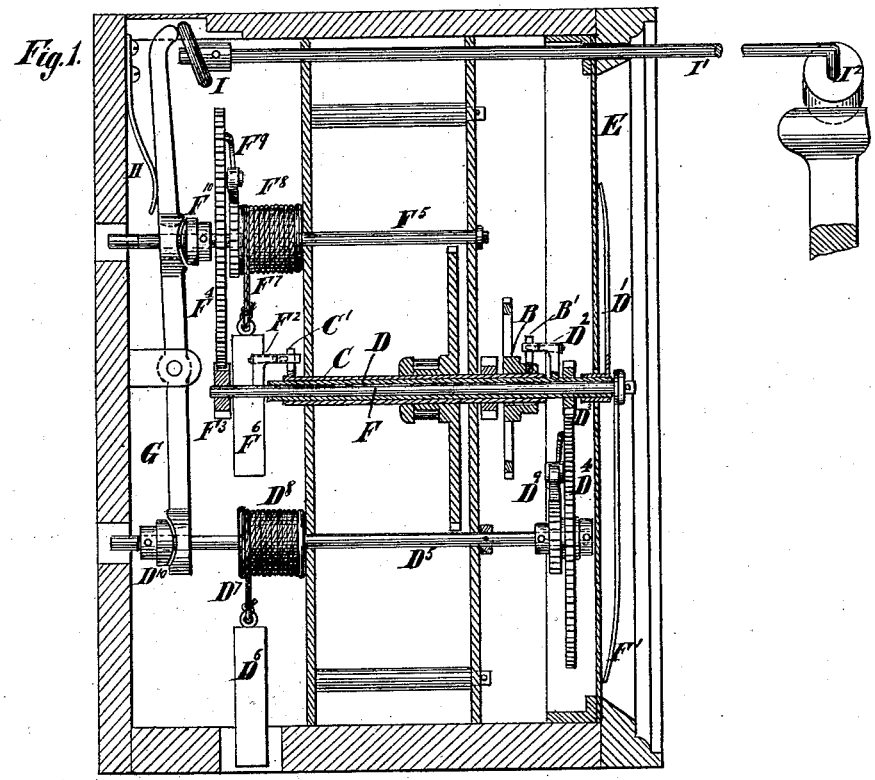
Figure 2:
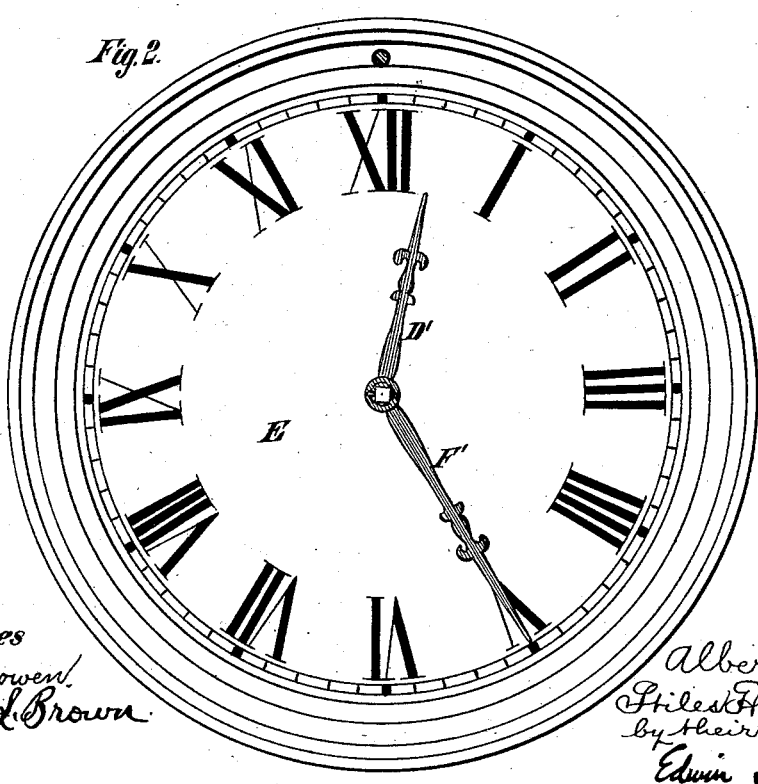

In the accompanying drawings, Figure 1 is a sectional elevation of an apparatus embodying our improvement, and Fig. 2 is a front view of the same.

Similar letters of reference designate corresponding parts in both figures.

Our improvement is embodied in a clock mechanism, which may be in any suitable style, except in certain particulars, which will be hereinafter described. We have not shown the train of wheels comprised in the clock mechanism, but only such parts of the clock mechanism as are necessary to an understanding of our improvement. The clock mechanism may be driven by a spring or weight.

B designates the arbor in the clock mechanism on which the hour-hand would be mounted if the clock mechanism were used to indicate time in the usual manner. This arbor is hollow and mounted in bearings in any suitable manner; or it may be otherwise supported. Instead of an hour-hand, it is provided with an arm, B'.

C designates the arbor in the clock mechanism on which the minute-hand would be mounted if the clock mechanism were used to indicate time in the usual manner. This arbor is hollow and extends through the arbor B. It may be supported in bearings in a well-known manner. Instead of being provided with an ordinary hand, it will be furnished with an arm, C'.

Within the arbor C fits a hollow spindle, D, which carries a hand, D', for recording hours upon an ordinary clock-dial, E, and is provided with an arm, $D^2$, projecting in the path of the hour-arbor arm B'. This spindle D has mounted on it a toothed pinion, $D^3$, which engages with a gear-wheel, $E^4$, arranged on a shaft, $D^5$. This shaft $D^5$ may be mounted in suitable bearings and impelled by a spring or by a weight. We have shown for this purpose a weight, $D^6$, attached to a cord, $D^7$, which is attached to and wound upon a pulley, $D^8$, affixed to the shaft $D^5$. The gear-wheel $D^4$ is preferably mounted loosely upon the shaft $D^5$, and derives motion from the shaft by means of a pawl-and-ratchet connection, $D^9$, for then the shaft may be rotated by a key applied to its rear end to wind up the cord $D^7$ without rotating the said gear-wheel. The weight in descending rotates the shaft $D^5$, so that the latter will impart a rotary movement to the spindle D in such direction that the hour-hand D' will be caused to travel around the dial E in the same direction as the hour-hand of an ordinary clock travels around the dial of the clock. A friction-brake, presently to be described, controls the rotation of the shaft $D^5$, the spindle D, and the travel of the hour-hand D'. When this brake releases these parts the hour-hand D' travels around the dial until the arm $D^2$ on the spindle D comes in contact with the arm B' on the arbor B.

Within the spindle D a spindle, F, is arranged. This spindle has affixed to it a hand, F', whereby minutes are recorded on the dial E. It is also provided with an arm, $F^2$, which projects into the path of the arm C' of the arbor C. On the spindle F is a toothed pinion, $F^3$, which engages with a gear-wheel, $F^4$, arranged on a shaft, $F^5$. This shaft $F^5$ may be supported in any suitable bearings. While this shaft may, if desirable, be rotated by a spring, we have shown it as rotated by a weight, $F^6$, attached to a cord, $F^7$, attached to and wound upon a pulley, $F^8$, which is affixed to the shaft $F^5$. Under the influence of this weight the minute-hand F', when permitted by the friction-brake, is caused to travel around the dial E in the same direction as the minute-hand of an ordinary clock, but only so far as it can travel before the arm $F^2$ on the spindle F comes into contact with the arm C' on the arbor C. The gear-wheel $F^4$ is loosely mounted on the spindle $F^5$, and secured thereto by a pawl-and-ratchet connection, $F^9$; hence the spindle may be rotated by a key applied to its rear end for the purpose of winding up the cord $F^7$ without shifting the minute-hand F'.

The friction-brake consists of a lever, G, pivoted between the ends, and bearing at one side of its pivot against the forward side of a collar, $F^{10}$, arranged upon the shaft $F^5$, and at the other side of its pivot against the rear side of a collar, $D^{10}$, arranged upon the shaft $D^5$. A spring, H, acts upon the lever G so as to cause it to press against both the collars $F^{10}$ and $D^{10}$. A cam, I, consisting of a disk arranged obliquely upon a shaft, I', serves, when the shaft I' is rotated in one direction, to rock the lever G so that it will not bear against either of the collars $F^{10}$ or $D^{10}$. On the forward end of the shaft I' is a rocker-arm, $I^2$, against which any suitable device carried by a passing train may impinge, so as to cause the shaft to be rocked for the purpose of shifting the lever G.

We will now describe the operation of this mechanism.

The arbors B C rotate constantly, like the hour and minute arbors of an ordinary clock; hence the positions of their arms B' C' will continually be indicative of the time of day. They are not, however, visible in this example of our improvement. Whenever a passing train rocks the shaft I', and causes the brake-lever G to release the shafts $D^5$ $F^5$, the weights $D^6$ $F^6$ will, by rotating the said shafts and the spindles D F, cause the hour and minute hands D' F' to travel as far as they can before their arms $D^2$ $F^2$ come in contact with the arms B' C' of the arbors B C. As the hour and minute hands D' F' travel with very rapid motions to these positions, they will be in these positions before the brake-lever G again secures the shafts $D^5$ $F^5$ in position. If the train should stop for a considerable time in such position as to keep the brake-lever G away from the collars $D^{10}$ $F^{10}$ of the shafts $D^5$ $F^5$, the hour and minute hands D' F' would, during that time, move in unison with the arms B' C' of the arbors B C, and whenever the train passed beyond the rocker-arm $I^2$ the latter, by its gravity or otherwise, would instantaneously resume its normal position, and the brake-lever would lock the shafts $D^5$ $F^5$, the spindles D F, and the hour and minute hands D' F' in the position which they then occupied. The hour and minute hands would then indicate the time at which the train left until another train arrived. On the arrival of a second train the same operation would be repeated, and the hour and minute hands would travel to the positions which were then occupied by the arms B' C' of the arbors B C.

If at a station where the apparatus is to be used there are long intervals of time between the arrivals of trains, it will be well to make the arms $D^2$ $F^2$ on the arbors D F of jointed sections. In such case the sections will be so jointed as to yield when the arms B' C' of the spindles B C move against them from behind, so as to allow the arms B' C' to pass by, but so that when they move against the arms B' C' from behind they cannot yield.

In some cases we may arrange hour and minute hands upon the arbors B C, outside the dial. Then the arms C', B', $F^2$, and $D^2$ will be omitted, and only the hand F' will be used as a recorder of the departure of trains. An arm will then be arranged upon the hand F' so as to extend back into the plane of the minute hand carried by the arbor C. Such arm will preferably be jointed to permit the minute-hand carried by the arbor C to pass the hand F'. The arm on the hand F' would have to be so near its outer end as not to engage with the hour-hand carried by the arbor B.

It will be obvious that by the apparatus described the times of the departure of trains will be recorded by the trains themselves, and that this will be advantageous not only because of the labor saved, but also owing to the greater accuracy with which the times will be recorded.

What we claim as our invention, and desire to secure by Letters Patent, is—

In an apparatus for recording the times of the departures of railway-trains, the combination of a dial, a hand or hands arranged to indicate time upon the dial and mounted upon a spindle or spindles, means for impelling the spindle or spindles, so as to cause the travel of the hand or hands, an arbor or arbors caused by clock-work to travel like the hour and minute hand arbors of an ordinary clock, and provided with means for arresting the said hand or hands, and means capable of being operated by passing trains for controlling the rotation of the spindle or spindles, substantially as specified.

ALBERT H. DEAN.
STILES H. WHITING.

Witnesses:
CHAS. E. WILMOT,
SAML. PENDLETON.